Oct. 14, 1924.
H. C. KNOWLES
1,511,480
DOUBLE ROW ANTIFRICTION BEARING
Filed May 13, 1920 2 Sheets-Sheet 1
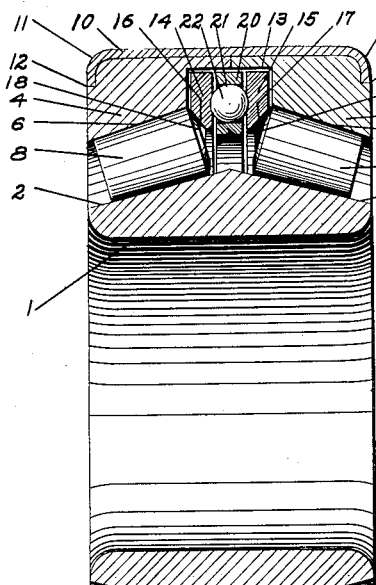
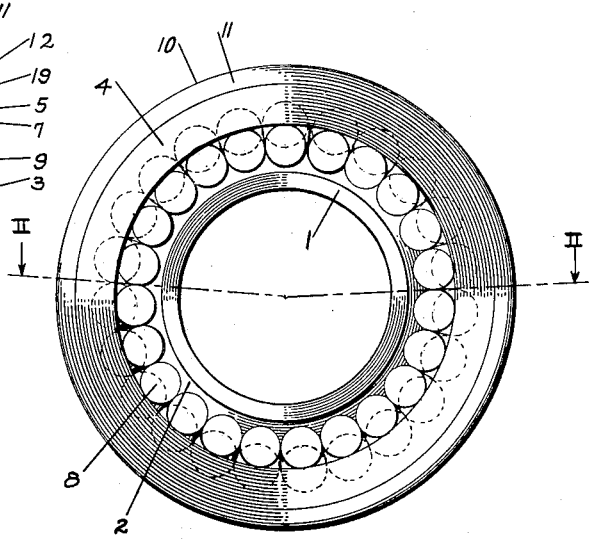
Fig. I.
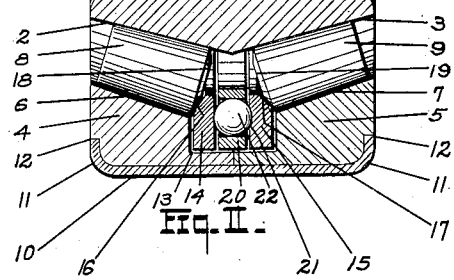
Fig. II.
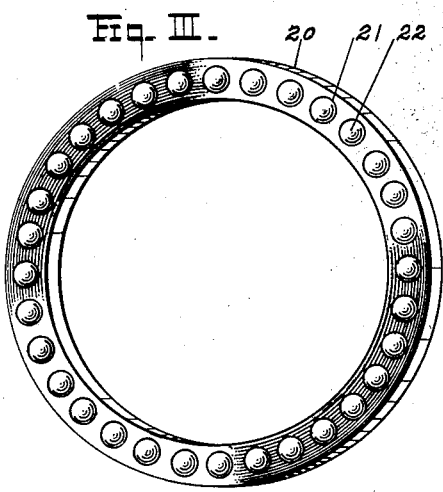
Fig. III.
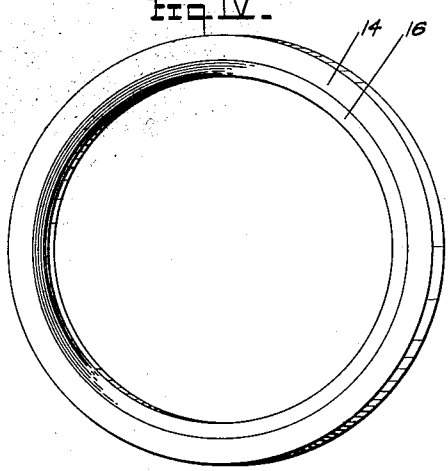
Fig. IV.
INVENTOR.
Harford C. Knowles.
BY Chester W. Braselton
Harry W. Lindsey Jr.
ATTORNEYS Oct. 14, 1924.
H. C. KNOWLES
DOUBLE ROW ANTIFRICTION BEARING
Filed May 13, 1920      2 Sheets-Sheet 2
1,511,480
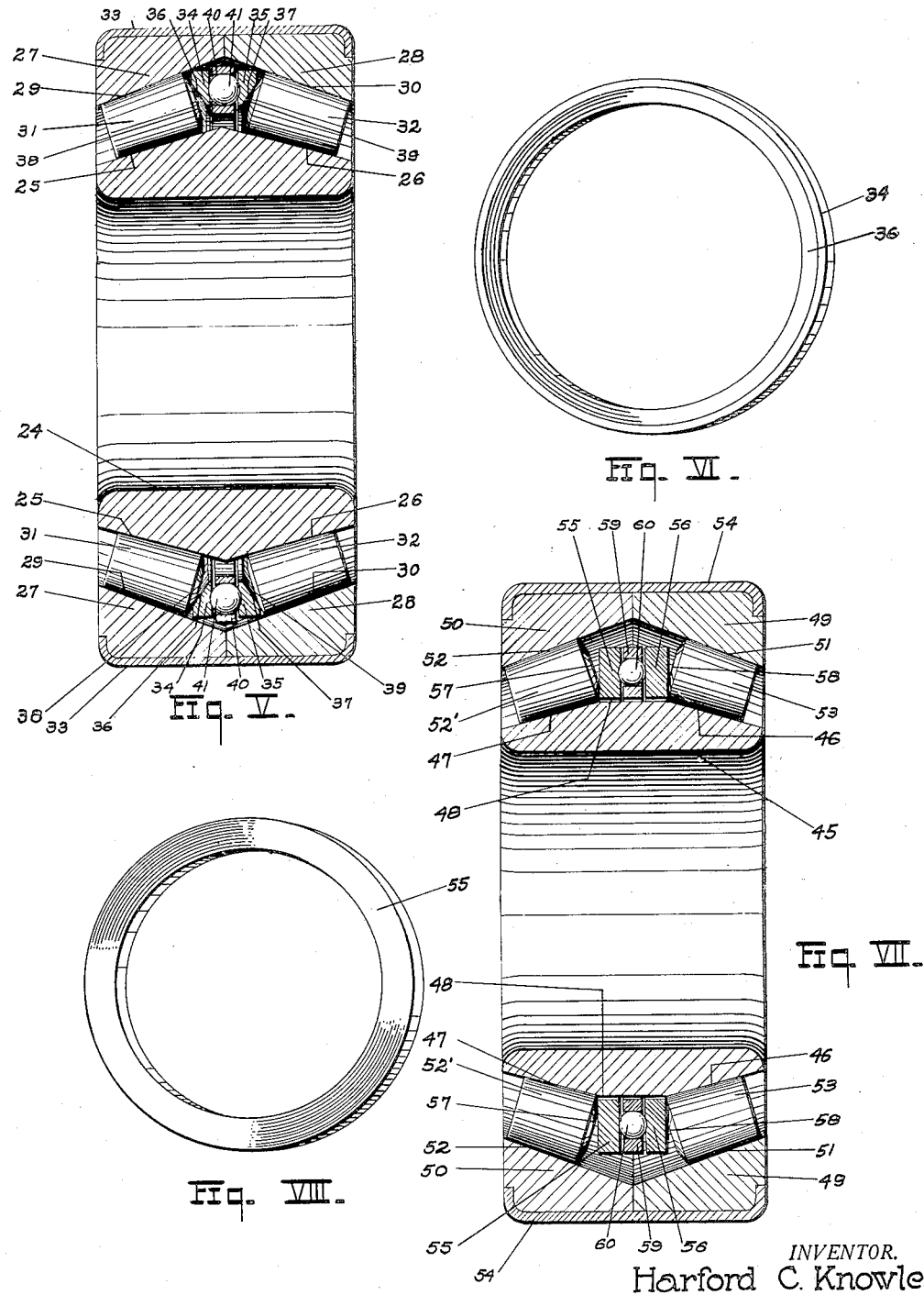
INVENTOR.
Harford C. Knowles.
BY Chester W. Braselton
Harry W. Lindsey Jr.
ATTORNEYS Patented Oct. 14, 1924.

1,511,480

UNITED STATES PATENT OFFICE.

HARFORD C. KNOWLES, OF ELMIRA, NEW YORK, ASSIGNOR TO THE WILLYS-MORROW COMPANY, OF ELMIRA, NEW YORK, A CORPORATION OF OHIO.

DOUBLE-ROW ANTIFRICTION BEARING.

Application filed May 13, 1920. Serial No. 381,053.

*To all whom it may concern:*

Be it known that I, HARFORD C. KNOWLES, residing at Elmira, county of Chemung, State of New York, have invented certain new and useful Improvements in Double-Row Antifriction Bearings, of which I declare the following to be a full, clear, and exact description.

This invention relates to an improved double row anti-friction bearing of the class of which two sets of tapered rollers are employed, and particularly to the provision of novel means for taking up end thrust to which the bearing may be subjected and distributing such a thrust throughout the bearing.

One object of the invention is to provide an improved bearing of this character which is better adapted to carry an end thrust load as well as a radial load.

Another object of the invention is to provide a bearing of this character wherein the frictional resistance to the movement of the rollers is reduced by providing a suitable rolling contact between each roller and the means employed for transmitting thrust from one set of rollers to the other.

A further object of the invention is to provide a structure wherein the frictional resistance between the several parts will be reduced to a minimum by the use of suitable anti-frictional devices within the bearing.

Further objects of the invention relate to economies of manufacture and details of construction as will hereinafter appear from the detailed description to follow.

The objects of the invention may be accomplished in one instance by the structure illustrated in the accompanying drawings and described in the following specification, but it is evident that the particular construction and arrangement of the parts may vary without departing from the scope of the invention as pointed out in the appended claims. A structure constituting one embodiment of the invention is illustrated in the accompanying drawings forming a part thereof in which:

Figure I is a side elevational view of a complete bearing illustrating the location of the parts when in assembled position.

Figure II is a longitudinal sectional view, taken along the line II—II of Figure I and illustrating the relative location of the several elements when in assembled position within the bearing.

Figure III is a side elevational view of a spacing ring adapted to support a plurality of anti-friction members in position to be engaged by the thrust rings located upon opposite sides of the transverse center line of the bearing.

Figure IV is a side elevational view of one of the thrust rings mentioned above.

Figure V is a transverse sectional view, similar to Figure II, and illustrating a somewhat modified form of a thrust transmitting means.

Figure VI is a side elevational view of one of the thrust rings illustrated in Figure V.

Figure VII is a view similar to Figures II and V illustrating another modified form of thrust transmitting means, Figure VIII is a side elevational view of one of the thrust rings shown in Figure VII.

In the usual form of double row roller bearings it has been the practice to form a shoulder upon the inner bearing member intermediate the two sets of rollers which shoulder is adapted to bear against the ends of the rollers when thrust is applied to the bearing and the result of this construction is that the rollers to which the thrust is thus directly applied are wedged between the inner and outer bearing surfaces to such an extent as to become incapable of properly operating under any considerable degree of thrust load. It has been found, moreover, that the bearings formerly used wherein the rollers of the different sets are spaced from each other and held in position by a cage are less efficient for taking heavy loads than is the full type of roller bearing. In this bearing shown and described in this application, two full sets of tapered rollers are employed and suitable means is positioned between the two sets of rollers so that when thrust is applied to the inner bearing member the force of this thrust may be taken upon the bearing surfaces of one set of rollers instead of being directly applied to the ends of the rollers as in the usual construction previously employed. As there is a tendency for the tapered rollers to move in a direction towards the larger ends of the rollers when a considerable load is applied thereto it results that the placing of an additional thrust upon these rollers will result in a slight movement of the rollers inwardly toward the transverse center line of the bearing whereupon a portion of the thrust load is applied to the thrust transmitting devices positioned between the two sets of rollers and from thence to the opposite sets of rollers whereupon the thrust load is properly distributed between the two sets of rollers while at the same time by the transmission of the thrust load to the bearing surfaces of the first set of rollers instead of placing the same upon the end portions thereof, the rollers are not wedged between the bearing surfaces to the extent of preventing their proper rotation and in this way the bearing is able to sustain a proportionally greater degree of thrust load than any of those in ordinary use.

In the embodiment of the invention illustrated in Figures I and VI, inclusive, I designates the inner bearing member which is adapted to be suitably mounted upon a shaft and is provided with inclined outer surfaces 2 and 3 tapering from a point adjacent the center transverse line of the bearing. 4 and 5 designate outer bearing members provided with suitable inner bearing surfaces 6 and 7 tapering from the transverse center line of the bearing and adapted to cooperate with the bearing surfaces 2 and 3 formed upon the inner bearing members to provide race-ways for two sets of tapered rollers designated by the reference characters 8 and 9. A cylindrical sleeve 10 is provided for receiving the outer bearing members 4 and 5, and the outer end portions of the sleeve 10 are bent inwardly as indicated in 11 into grooves 12 formed in the outer edges of the outer bearing members 4 and 5. By reason of this construction, the outer bearing members are firmly secured in position and retained against separation relative to each other. The sleeve 10 is adapted to be inserted within the member which is to be anti-frictionally supported from the sleeve in such a manner as to be held in close engagement relative thereto in a manner well known in the art.

A groove 13 is formed in the inner faces of each of the outer bearing members 4 and 5 adjacent the meeting edges of said members which grooves cooperate when the outer bearing members are properly positioned relative to each other to form a circular depression located substantially at the transverse center line of the bearing and adapted to receive the thrust transmitting elements preferably employed for transmitting thrust from one set of rollers to the other. The grooves 13 are so proportioned as to permit a slight clearance for the thrust transmitting mechanism in a direction longitudinally of the bearing as shown in Figure II, whereby the thrust transmitting mechanism is capable of a slight movement longitudinally of the bearing under the influence of the thrust transmitted thereto by one set of rollers. The thrust transmitting mechanism above referred to comprises a pair of thrust rings 14 and 15 each of which is positioned adjacent one of the sets of tapered rollers, and which are provided with beveled portions 16 and 17 respectively adapted to co-operate with the conical portions 18 and 19 of the rollers 8 and 9 respectively whereby each roller is given a rolling contact with its adjacent thrust ring thus reducing the frictional resistance between the two sets of rollers and the thrust transmitting mechanism and insuring a free rolling movement for the tapered rollers of each set. A spacing ring 20 provided with a series of openings 21 extending therethrough and suitably spaced from each other throughout its length is positioned between the two thrust rings, and suitable antifriction elements 22 are positioned within the openings 21 and bear against the two thrust rings whereby free rotative movement of the thrust rings relative to each other is insured and means is provided for permitting one set of tapered rollers to travel at a higher rate of speed than the other.

In the modification illustrated in Figures V and VI the inner bearing member 24 is similar in all respects to the inner member I previously described and is provided upon its outer face with outwardly inclined surfaces 25 and 26 respectively to provide raceways for two sets of tapered rollers 31 and 32 respectively. Outer bearing members 27 and 28 provided upon their inner surfaces with inwardly inclined bearing surfaces 29 and 30 respectively are positioned outwardly of the inner bearing member and so arranged that the bearing surfaces 29 and 30 cooperate with the bearing surfaces 25 and 26 to form raceways for the two sets of rollers 31 and 32. An outer sleeve 33, similar to the sleeve 10 shown in Figures I and II, encloses the outer bearing members in a manner similar to that illustrated in Figures I and II and retains the outer bearing members in position relative to each other and the remaining portions of the bearing.

The thrust transmitting mechanism illustrated in this form of the invention differs somewhat from that previously described, being preferably so formed as to be located adjacent the outer bearing members and being arranged to take the thrust from the tapered rollers at points outward radially of the axes of said rollers. The thrust mechanism in this form of invention as in that illustrated in Figures I and II of the drawings comprises a pair of similar thrust rings 34 and 35 adapted to be positioned adjacent the larger ends of the rollers 31 and 32 respectively, said rings 34 and 35 being provided with beveled surfaces 36 and 37 respectively. The two sets of tapered rollers 31 and 32 are each provided with conical or beveled portions 38 and 39 at their larger ends adapted for engagement with the beveled surfaces 36 and 37 of the thrust rings whereby suitable rolling contact is obtained between the rollers of the two sets and the adjacent thrust ring, and a spacing ring 40, similar to the ring 20 described in Figures I and II, is located between the thrust rings and is provided in a similar manner with spaced openings for the reception of a plurality of anti-friction elements 41 adapted to bear against the two thrust rings and permit relative rotation of the thrust rings whereby the tapered rollers of each set are permitted to travel at different speeds in the bearing.

In the form of invention illustrated in Figures VII and VIII an inner bearing member 45 is provided having a pair of outwardly inclined surfaces 46 and 47 located upon opposite sides of the transverse center line of the bearing and having a cylindrical outer surface 48 located adjacent the transverse center line of the bearing. A pair of outer bearing members 49 and 50 provided with inwardly inclined bearing surfaces 51 and 52 respectively which surfaces are adapted to cooperate with the outwardly inclined surfaces 46 and 47 to form raceways for two sets of tapered rollers 52' and 53 in the manner previously described in connection with the other forms illustrated are positioned outwardly of the inner bearing member. An outer sleeve 54 encloses the outer bearing members and is secured thereto in a manner previously described for the purpose of properly retaining these outer bearing members in position relative to each other and the remaining parts of the bearing.

Located between the two sets of tapered rollers is a thrust mechanism comprising a pair of thrust rings 55 and 56 of said rings having plane outer faces adapted to bear against the conical inner ends 57 and 58 of the two sets of rollers 52' and 53 inwardly of the axes of said rollers whereby rolling contact between the rollers and rings is secured and thus the frictional resistance to the free movement of the rollers is reduced. A spacing ring 59 similar in all respects to the spacing ring previously described is provided with suitable spaced openings for the reception of anti-friction elements 60 adapted to bear against the inner surfaces of the thrust rings and thus insure free rotative movement of the thrust rings relative to each other and permit one set of tapered rollers to travel at a greater speed than the other. In this form of the invention it will be seen that the thrust mechanism is located close to the outer surface of the inner bearing member and extends adjacent the cylindrical portion thereof, the same being arranged in such a manner as to receive the thrust from the tapered rollers inwardly of the axes thereof instead of outwardly of the axes as is the case in the other forms illustrated.

From the foregoing description it will be readily understood that in the various modified forms of the invention illustrated herewith when thrust is applied to the inner bearing member no pressure will be exerted directly upon the ends of the rollers but as the inner bearing member is forced in one direction, thrust will be applied to the bearing surfaces of the roller thus permitting the rollers to move backwardly against the thrust and preventing the wedging of the rollers between the inner and outer bearing surfaces. As the rollers upon which the thrust is exerted move backwardly in response to the thrust they will exert pressure upon the thrust mechanism and in this way transmit a portion of the thrust to the opposite set of rollers, thus permitting the thrust load to be equalized between the two sets of rollers. Moreover, it will be seen that by the provision of anti-friction mechanism between the two thrust rings, the rings are readily enabled to travel at different speeds thus eliminating the danger of having a sliding contact between the tapered ends of one set of rollers and one of the thrust rings. It will also be apparent that the beveled ends of the tapered rollers in contact with the beveled faces of the rings as shown in Figures II and V, and the beveled ends of the rollers contacting with the flat surfaces of the rings as shown in Figure VII will provide such an arrangement as to insure proper rolling contact at all times between the ends of the rollers and the thrust rings and thus eliminate the danger of excessive friction between these parts in the operation of the bearing.

While I have shown and described in considerable detail certain specific embodiments of the invention, it is to be understood that this showing and description is illustrative only and for the purpose of rendering the invention more clear and that I do not regard the invention as limited to the precise details of construction illustrated or described except in so far as I have included such limitations within the following claims in which it is my intention to claim all novelty inherent in my invention broadly as well as specifically.

What I claim as new and desire to claim by Letters Patent is:

1. In a roller bearing, the combination with inner and outer bearing members and two sets of rollers interposed therebetween, of a pair of rings positioned between the two sets of rollers each ring being adapted to be engaged by the ends of the rollers of one set, and anti-friction devices between the two rings serving to space the rings from each other and to transfer axial movement from one ring to the other.

2. In a roller bearing, the combination with inner and outer bearing members and two sets of rollers interposed therebetween, of a pair of rings positioned between the two sets of rollers to be engaged thereby and capable of rotative movement as well as slight movement longitudinally of the bearing, and anti-friction devices located axially between said rings for reducing the resistance to the free rotation of the rings and for transferring said longitudinal movement from one ring to the other.

3. In a bearing, inner and outer bearing members, two sets of tapered rollers therebetween, and means including a pair of relatively rotatable members arranged between said rows of rollers for transmitting end thrust from one row to the other.

4. In a bearing, inner and outer bearing members, two sets of tapered rollers therebetween, and means comprising a pair of relatively rotatable rings, each having rolling engagement with the rollers of one set for transmitting end thrust from the rollers of one set to those of the other set.

5. In a roller bearing, the combination with inner and outer bearing members and two sets of rollers interposed therebetween, of a pair of rings positioned between the two sets of rollers, each ring being adapted to be engaged by the ends of the rollers of one set, an intermediate ring between said pair of rings, and a series of balls carried by said intermediate ring and freely engaging the inner faces of the first-mentioned rings whereby to transmit axial movement from one to the other.

In testimony whereof, I affix my signature.

HARFORD C. KNOWLES.